(12) United States Patent
Traywick et al.

(10) Patent No.: US 12,438,874 B2
(45) Date of Patent: Oct. 7, 2025

(54) ARTIFICIAL INTELLIGENCE-SUPPORTED PROXY WORKER DETECTION USING VOICE AUTHENTICATION

(71) Applicant: Bank of America Corporation, Charlotte, NC (US)

(72) Inventors: Edward Lee Traywick, Bellbrook, OH (US); Ava Elizabeth Wallace, Charlotte, NC (US); Christopher D. Nobile, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 378 days.

(21) Appl. No.: 18/094,102

(22) Filed: Jan. 6, 2023

(65) Prior Publication Data
US 2024/0236086 A1 Jul. 11, 2024

(51) Int. Cl.
*H04L 9/40* (2022.01)
*G10L 17/04* (2013.01)
*G10L 17/06* (2013.01)
*G10L 17/22* (2013.01)

(52) U.S. Cl.
CPC .......... *H04L 63/0861* (2013.01); *G10L 17/04* (2013.01); *G10L 17/06* (2013.01); *G10L 17/22* (2013.01)

(58) Field of Classification Search
CPC ..... H04L 63/0861; G10L 17/07; G10L 17/06; G10L 17/22
See application file for complete search history.

(56) References Cited

U.S. PATENT DOCUMENTS

| | | |
|---|---|---|
| 10,979,423 B1 | 4/2021 | Garner, IV et al. |
| 11,115,410 B1 | 9/2021 | Hanson et al. |
| 11,425,529 B2 | 8/2022 | Mehta et al. |
| 11,501,298 B2 | 11/2022 | Bacastow |
| 11,528,359 B1 | 12/2022 | Harris |
| 11,545,155 B2 * | 1/2023 | Gomar .................... G10L 17/00 |
| 11,546,231 B2 | 1/2023 | Kanojia et al. |
| 11,546,277 B2 | 1/2023 | Firinberg et al. |
| 2017/0279968 A1 * | 9/2017 | Fadili ..................... H04N 7/147 |
| 2019/0348041 A1 * | 11/2019 | Cella ....................... G10L 15/30 |
| 2021/0398144 A1 | 12/2021 | Appadurai et al. |
| 2022/0109673 A1 | 4/2022 | Robinson-Morgan et al. |

(Continued)

*Primary Examiner* — Oleg Survillo
(74) *Attorney, Agent, or Firm* — Banner & Witcoff, Ltd.

(57) ABSTRACT

Aspects of the disclosure relate to a voice authentication platform. The voice authentication platform may monitor remote communications to identify a first voice sample. The voice authentication platform may train a voice authentication model to output similarity scores, based on the first voice sample. The voice authentication platform may identify a second voice sample. The voice authentication platform may generate a similarity score by inputting the second voice sample into the model. The voice authentication platform may compare the similarity score to a threshold value. If the similarity score meets or exceeds the threshold value, the voice authentication platform may update a user profile. If the similarity score is below the threshold value, the voice authentication platform may initiate a security action. The voice authentication platform may create an iterative feedback loop to update the voice authentication model.

20 Claims, 12 Drawing Sheets

(56) References Cited

U.S. PATENT DOCUMENTS

| | | | |
|---|---|---|---|
| 2022/0114594 A1* | 4/2022 | Nunes | G06Q 20/4016 |
| 2022/0116388 A1* | 4/2022 | Johnson | G10L 25/72 |
| 2022/0172729 A1 | 6/2022 | Mohajer et al. | |
| 2022/0262370 A1* | 8/2022 | Carroll | G10L 17/14 |
| 2022/0365669 A1 | 11/2022 | de Vries | |
| 2023/0004650 A1 | 1/2023 | Chapman et al. | |
| 2023/0004972 A1 | 1/2023 | Rapowitz et al. | |
| 2023/0005066 A1 | 1/2023 | Bansal | |
| 2023/0006830 A1 | 1/2023 | Yadav et al. | |
| 2023/0006989 A1 | 1/2023 | Hodge | |
| 2023/0007005 A1 | 1/2023 | Koneru | |
| 2023/0245023 A1* | 8/2023 | Santharam | G06Q 30/0202 |
| | | | 705/7.25 |
| 2023/0247435 A1* | 8/2023 | Pandit | H04W 12/72 |
| | | | 455/411 |
| 2024/0305623 A1* | 9/2024 | Mavani | H04L 63/0823 |

\* cited by examiner

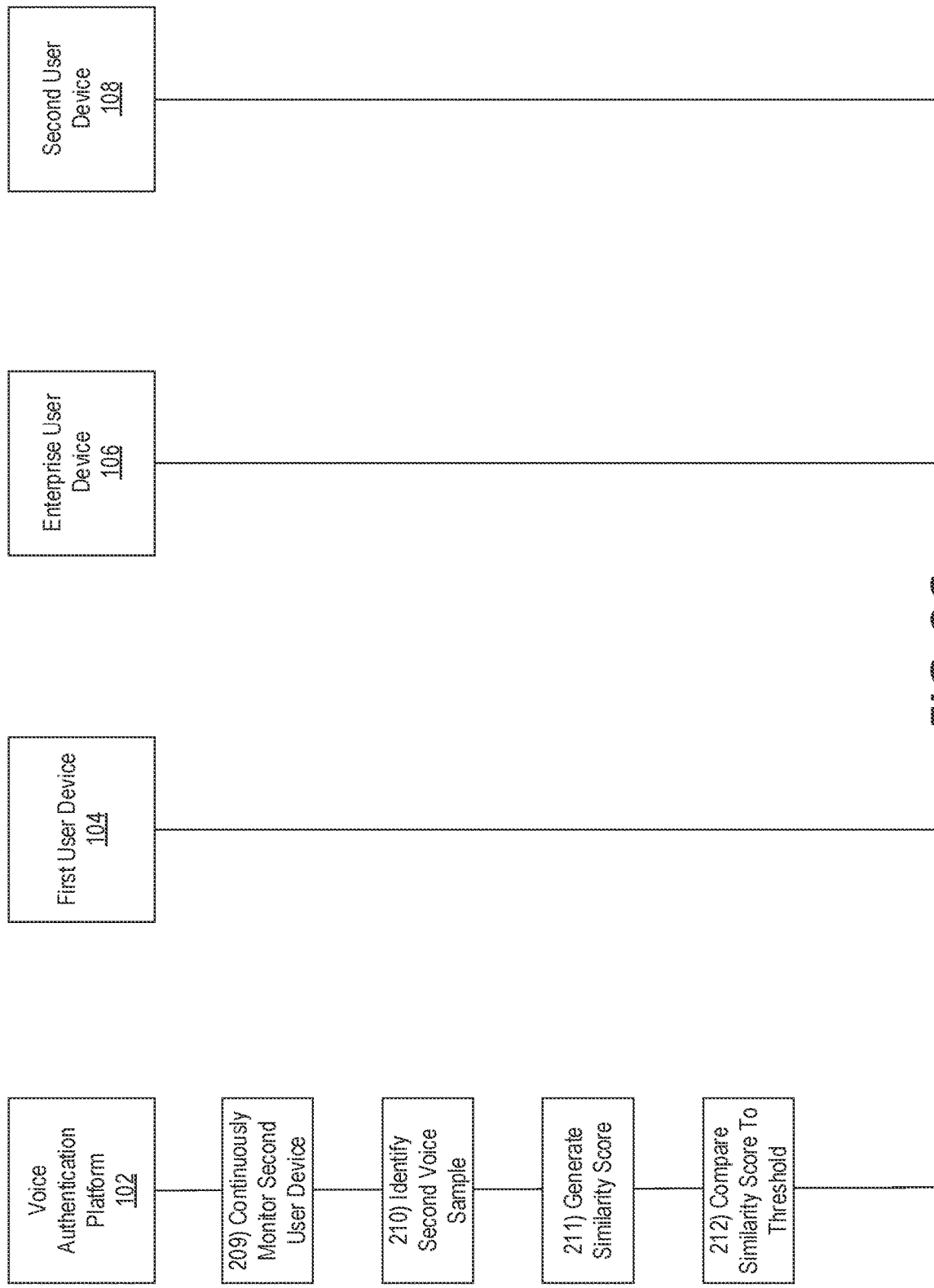

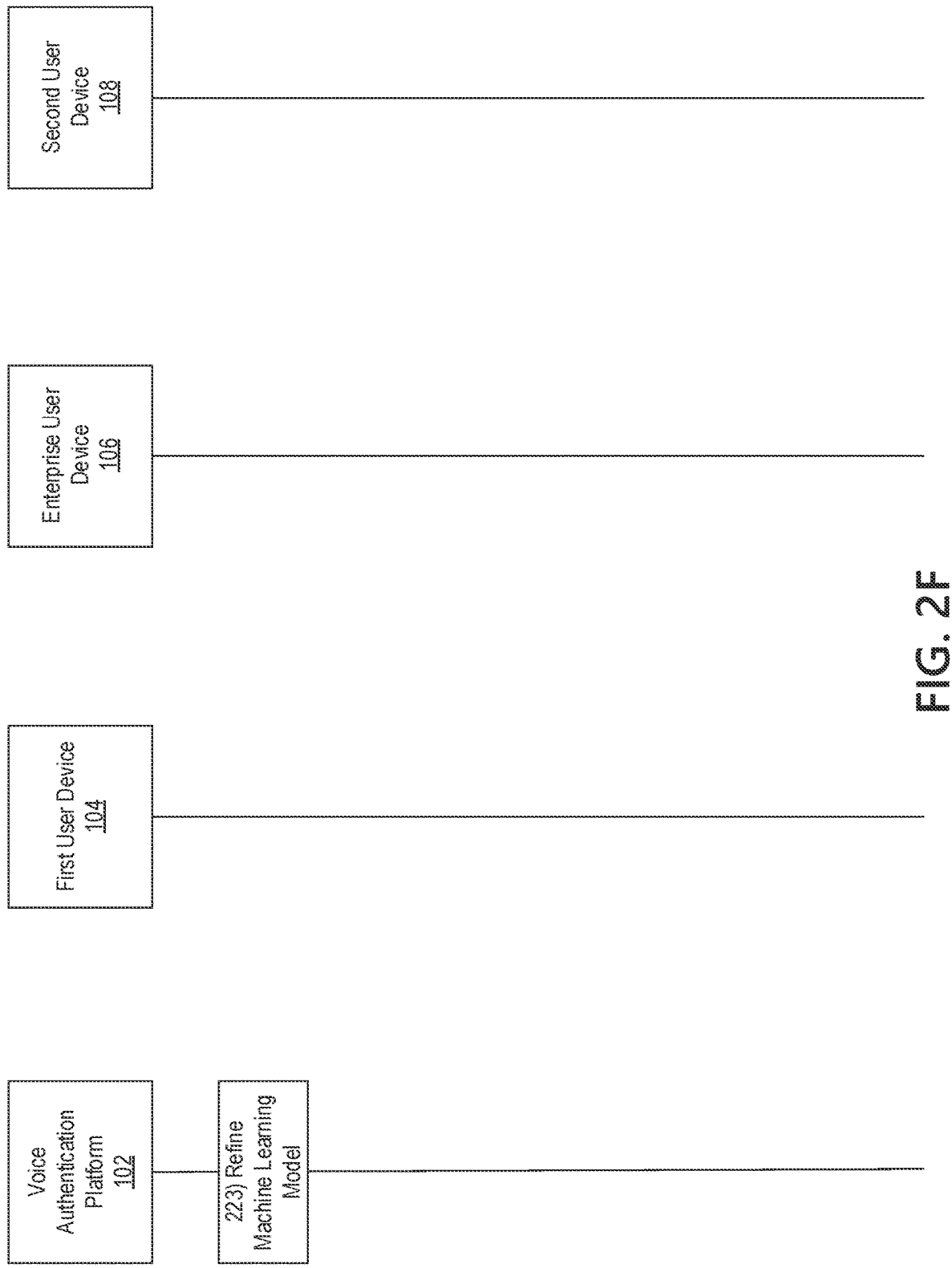

ARTIFICIAL INTELLIGENCE-SUPPORTED PROXY WORKER DETECTION USING VOICE AUTHENTICATION

BACKGROUND

Aspects of the disclosure relate to proxy worker detection. In some instances, an enterprise organization (e.g., a financial institution, and/or other institution) may conduct remote communications (e.g., a virtual interview, and/or other remote communications) with a potential employee. In some examples, an individual may impersonate the potential employee during the remote communications. Additionally, in some instances the individual may impersonate and/or continue to impersonate the potential employee (i.e., as a proxy worker) during later remote communications (e.g., virtual meetings, and/or other remote communications) after the potential employee joins the enterprise organization. In some examples, enterprise users (e.g., employees of the enterprise organization) may never meet proxy workers face to face. Accordingly, it may be important to distinguish between proxy workers and valid employees/applicants, in order to prevent impersonation. Additionally, the true employee's voice may change over time. Accordingly, it may also be important to identify methods for incorporating such changes into the voice authentication process.

SUMMARY

Aspects of the disclosure provide effective, efficient, scalable, and convenient technical solutions that address and overcome the technical problems associated with proxy worker detection. In accordance with one or more embodiments of the disclosure, a computing platform with at least one processor, a communication interface, and memory storing computer-readable instructions may monitor remote communications between a first user device and an enterprise user device. Monitoring the remote communications may comprise gathering voice information corresponding to a first user. The computing platform may identify a first voice sample based on the gathered voice information corresponding to the first user. The computing platform may configure a user profile corresponding to the first user. Configuring the user profile may comprise linking the first voice sample to the user profile. The computing platform may train a voice authentication model based on the first voice sample. Training the voice authentication model may configure the voice authentication model to output similarity scores indicating a degree of similarity between voice samples and the user profile. The computing platform may monitor a second user device. Monitoring the second user device may comprise continuously gathering voice information corresponding to a second user. The computing platform may identify a second voice sample based on the continuously gathered voice information corresponding to the second user. The computing platform may execute the voice authentication model using the second voice sample as input. The computing platform may generate a first similarity score corresponding to the second voice sample based on executing the voice authentication model. Generating the first similarity score may comprise comparing the first voice sample to the second voice sample to identify a similarity between the first voice sample and the second voice sample. The computing platform may compare the first similarity score to a threshold value. The computing platform may identify whether or not the first similarity score meets or exceeds the threshold value based on the comparing. The computing platform may update the user profile based on the second voice sample, based on identifying that the first similarity score meets or exceeds the threshold value. The computing platform may initiate a security action, based on identifying that the first similarity score does not meet or exceed the threshold value. The computing platform may refine the voice authentication model based on the second voice sample.

In one or more instances, the security action may comprise one or more of: revoking access of a user device to an enterprise network, deleting the user profile, removing a user device from a list of authorized devices, removing the second user from a list of authorized users, or changing a password corresponding to the second user. In one or more examples, initiating the security action may comprise sending one or more commands to display a user interface to the enterprise user device and receiving user input from the enterprise user device. The user input may direct the computing platform to override the security action. The user input may direct the computing platform to initiate additional security actions.

In one or more instances, the additional security actions may comprise one or more of: revoking access of a user device to an enterprise network, deleting the user profile, removing a user device from a list of authorized devices, removing the second user from a list of authorized users, or changing a password corresponding to the second user.

In one or more examples, the computing platform may request a confirmation voice sample corresponding to the second user from the second user device. The confirmation voice sample may comprise a vocal key. The computing platform may execute the voice authentication model using the confirmation voice sample as input. The computing platform may generate a second similarity score corresponding to the confirmation voice sample based on executing the voice authentication model. Generating the second similarity score may comprise comparing the first voice sample to the confirmation voice sample to identify the second similarity score. The computing platform may identify a confirmation result, based on comparing the second similarity score to the threshold value. The computing platform may update the user profile based on the confirmation voice sample, based on identifying that the second similarity score meets or exceeds the threshold value. The computing platform may initiate the security action, based on identifying that the second similarity score does not meet or exceed the threshold value.

In one or more instances, the vocal key may comprise a randomly generated code. In one or more examples, the vocal key may comprise one or more terms selected by an enterprise user. In one or more instances, the computing platform may send a risk notification to the enterprise user device based on identifying that the second similarity score meets or exceeds the threshold value. The risk notification may comprise information indicating that a comparison was performed and may provide an option for manual user review.

In one or more examples, the computing platform may continue to monitor the first user device. Continuing to monitor the first user device may comprise continuously gathering voice information corresponding to the first user. The computing platform may identify the second voice sample based on the continuously gathered voice information corresponding to the first user. In one or more instances, the first user and the second user may comprise employees of an enterprise organization. The first user may comprise an authorized participant in the remote communications, and the second user may comprise an unauthorized participant in the remote communications impersonating the first user. In one or more examples, the security action may comprise integrating a conferencing software program with the computing platform via a wireless connection and removing the second user device from a conference hosted by the conferencing software program.

In one or more instances, the computing platform may compare the user profile to a second user profile. The computing platform may identify a duplicate profile based on the comparing. Comparing the user profile to the second user profile may comprise identifying a match between one or more voice samples corresponding to the user profile and one or more voice samples corresponding to the second user profile. The computing platform may delete the duplicate profile based on identifying the duplicate profile. In one or more examples, the computing platform may request an updated voice sample from the first user after a period of time. The computing platform may update the user profile based on the updated voice sample. In one or more instances, the period of time may be a chronological value determined by an enterprise user.

In one or more examples, generating the first similarity score may further comprise calculating an aggregate of similarity scores indicating that the first voice sample and the second voice sample correspond to a same individual, based on comparing the first voice sample to the second voice sample. In one or more instances, calculating the aggregate of similarity scores may comprise comparing features of the first voice sample and of the second voice sample. In one or more examples, the corresponding features of the first voice sample and of the second voice sample may comprise one or more of: voice quality, intonation, pitch, articulation rate, rhythm, vowel features, consonantal features, speech impediments, or non-linguistic features. In one or more instances, calculating the aggregate of similarity scores may further comprise identifying sample population features. Identifying the sample population features may comprise analyzing voice samples from a plurality of additional users other than the first user and the second user. The plurality of additional users may be coworkers of the first user. In these examples, calculating the aggregate of similarity scores may further comprise comparing the corresponding features of the first voice sample and of the second voice sample to the sample population features and updating, based on the comparing, the aggregate of similarity scores.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for AI-supported proxy worker detection using voice authentication in accordance with one or more example embodiments;

DETAILED DESCRIPTION

Figure 1A:
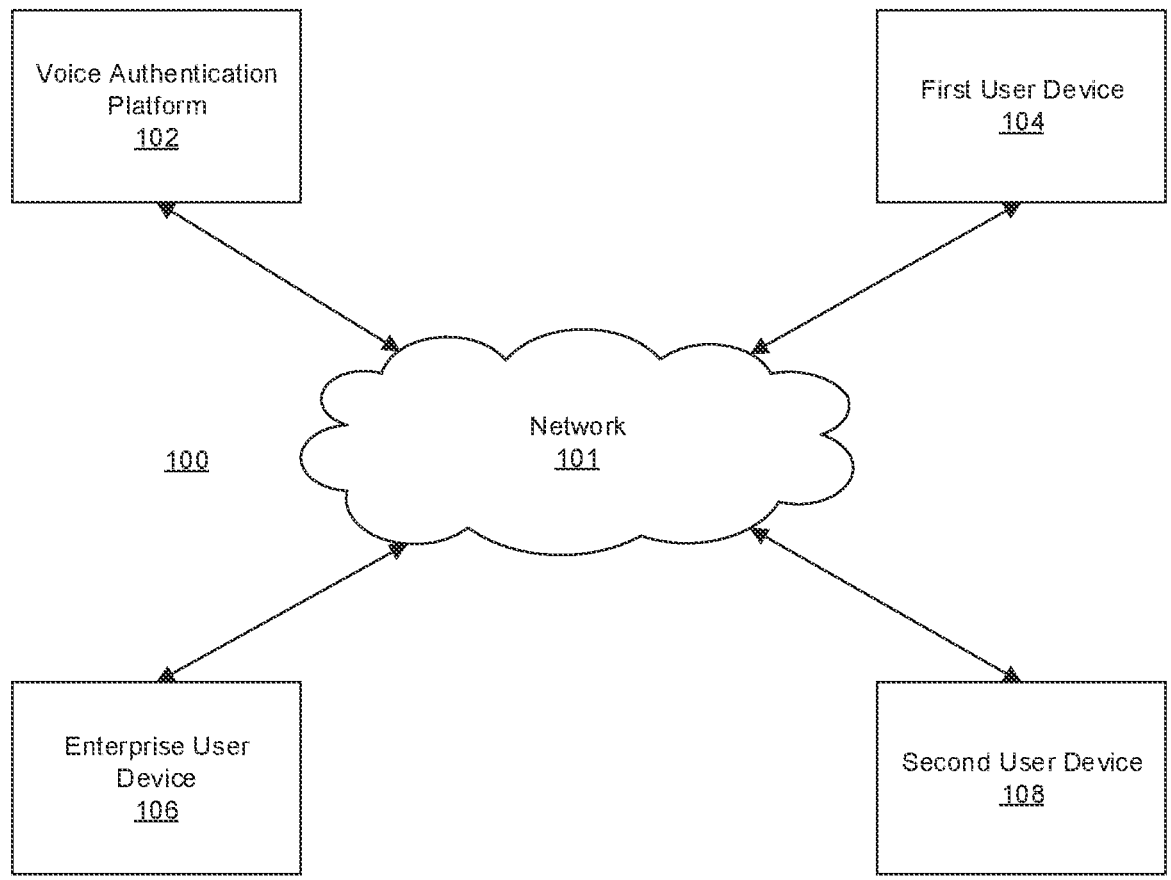
FIGS. 1A-1B depict an illustrative computing environment for artificial intelligence-supported (AI-supported) proxy worker detection using voice authentication in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for AI-supported proxy worker detection using voice authentication. An enterprise organization (e.g., a financial institution, and/or other institutions) may seek out potential employees. In some instances, enterprise users (e.g., recruiters, and/or other employees of the enterprise organization) may conduct remote communications (e.g., interviews, and/or other communications) with the potential employees. However, some potential employees may enlist the services of a proxy worker to impersonate the potential employee during the remote communications, in order to secure employment. In some instances, the potential employee may additionally or alternatively enlist the proxy worker to perform the job the potential employee is meant to perform, after the potential employee is hired.

In these instances, the enterprise organization may require some method of identifying whether an individual is the employee/potential employee they claim to be, and not a proxy worker impersonating the individual. Accordingly, a system may be designed to authenticate voices on remote communications in order to detect proxy workers impersonating employees or potential employees. The system may monitor remote communications between a user device corresponding to a potential employee and an enterprise user device corresponding to an enterprise user (e.g., an interviewer and/or other employee of the enterprise organization) during an initial communication (e.g., an interview, and/or other communications). The system may gather (e.g., with permission of the user) voice information from the potential employee (e.g., examples of pitch, bass, and/or other voice information) throughout the remote communication in order to identify a voice sample. The system may then configure a user profile for the potential employee and link the voice sample to the user profile. The system may monitor further remote communications between the potential employee or employee (e.g., further interviews, virtual workplace meetings, and/or other remote communications) to continuously gather voice information in order to identify a second voice sample. The system may train a voice authentication model to output similarity scores indicating a degree of similarity between voice samples (e.g., the second voice sample, and/or other voice samples) and the user profile. For example, the voice authentication model may identify that there is a low degree of similarity (e.g., a similarity score that is lower than a predetermined similarity threshold) between the second voice sample and the user profile because the first voice sample, linked to the user profile, has many features that differ from the features of the second voice sample. The system may identify whether or not the first similarity score meets or exceeds the threshold value based on comparing the similarity score to a threshold value and interpreting the result of the comparison. For example, if the system identifies that the similarity score does not meet or exceed the threshold value, the system may fail to authenticate the second voice sample as belonging to the employee from which the first voice sample was gathered, indicating that the system has detected a proxy worker and/or other impersonation.

Additionally or alternatively, enterprise organizations (e.g., financial institutions, or other institutions) may wish to have a protocol in place for responding to the result of the comparison. Accordingly, the system may initiate a security action (e.g., removing a detected proxy worker from a remote communication, revoking access permissions of the detected proxy worker's user profile, and/or other security actions) based on identifying that the similarity score does not meet or exceed the threshold value. Based on identifying that the similarity score does meet or exceed the threshold value, the system may instead update the user profile to incorporate the second voice sample. The system may refine the voice authentication model based on the second voice sample.

Figure 1B:
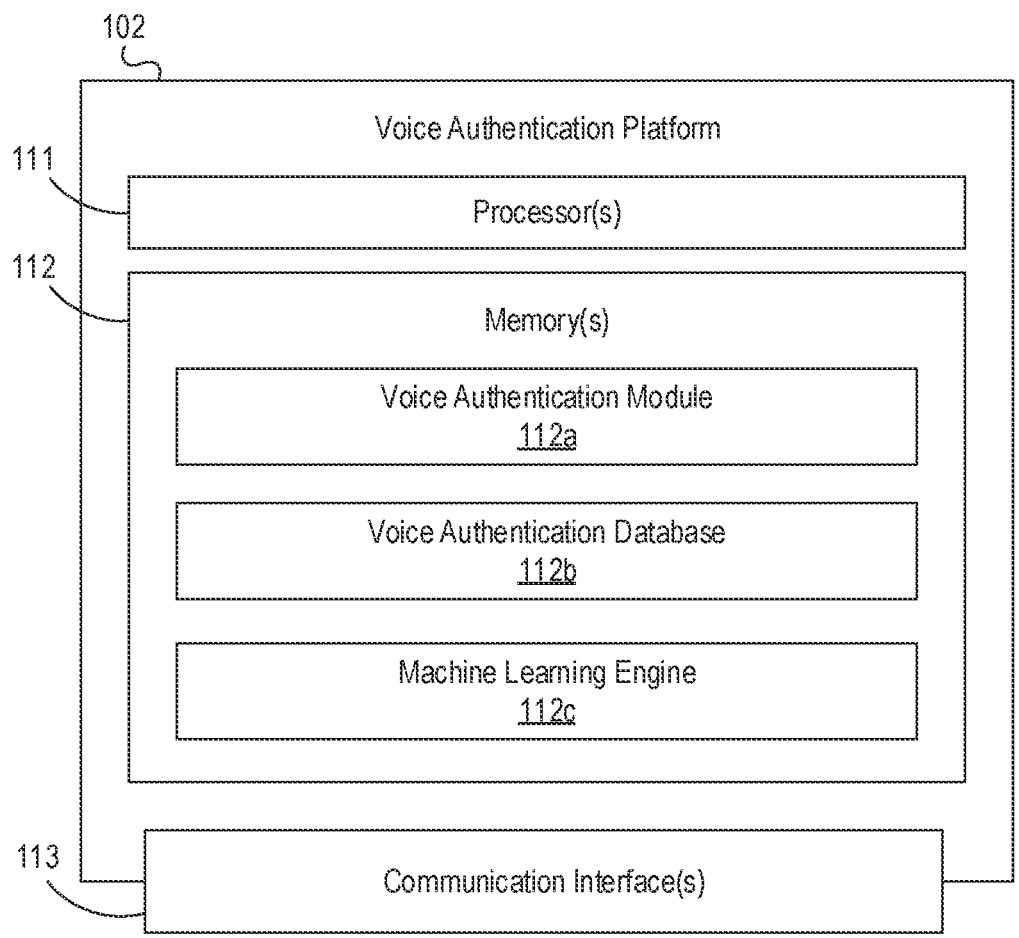

FIGS. 1A-1B depict an illustrative computing environment for AI-supported proxy worker detection using voice authentication in accordance with one or more example embodiments. Referring to FIG. 1A, computing environment 100 may include one or more computer systems. For example, computing environment 100 may include a voice authentication platform 102, a first user device 104, an enterprise user device 106, and a second user device 108.

As described further below, voice authentication platform 102 may be a computer system that includes one or more computing devices (e.g., servers, server blades, or the like) and/or other computer components (e.g., processors, memories, communication interfaces) that may be used to configure, train and/or execute one or more machine learning models, such as voice authentication models. For example, the voice authentication platform 102 may train the one or more voice authentication models to generate similarity scores indicating a degree of similarity between voice samples and a user profile. In some instances, voice authentication platform 102 may be controlled or otherwise maintained by an enterprise organization such as a financial institution. Although shown as an independent computing platform, in some instances, the voice authentication platform 102 may be part of and/or otherwise integrated into the enterprise user device 106 without departing from the scope of the disclosure.

First user device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., conducting remote communications, and/or other functions). In one or more instances, first user device 104 may correspond to a first user (who may, e.g., be a potential employee of the enterprise organization, such as a financial institution, be a current employee of the enterprise organization, may be otherwise associated with the enterprise organization, or the like). In one or more instances, the first user device 104 may be configured to communicate with one or more systems (e.g., voice authentication platform 102, enterprise user device 106, and/or other systems) to perform a data transfer, initiate remote communications, and/or to perform other functions.

Enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., conducting remote communications, receive display commands, and/or other functions). In one or more instances, enterprise user device 106 may correspond to an enterprise user (who may, e.g., be an employee of the enterprise organization such as a financial institution). In one or more instances, the enterprise user device 106 may be configured to communicate with one or more systems (e.g., voice authentication platform 102, first user device 104, and/or other systems) to perform a data transfer, initiate remote communications, receive display commands, and/or to perform other functions.

Second user device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., conducting remote communications, and/or other functions). In one or more instances, second user device 108 may correspond to a second user (who may, e.g., be an employee of the enterprise organization such as a financial institution, an employee of the enterprise organization impersonating another employee of the enterprise organization, or a proxy worker impersonating an employee of the enterprise organization). In some examples, the second user and the first user may be the same individual. In one or more instances, the second user device 108 may be configured to communicate with one or more systems (e.g., voice authentication platform 102, enterprise user device 106, and/or other systems) to perform a data transfer, initiate remote communications, and/or to perform other functions. In one or more examples, the second user device 108 may be the same device as first user device 104.

Computing environment 100 also may include one or more networks, which may interconnect voice authentication platform 102, first user device 104, enterprise user device 106, and second user device 108. For example, computing environment 100 may include a network 101 (which may interconnect, e.g., voice authentication platform 102, first user device 104, enterprise user device 106, and second user device 108).

In one or more arrangements, voice authentication platform 102, first user device 104, enterprise user device 106, and second user device 108 may be any type of computing device capable of sending and/or receiving requests and processing the requests accordingly. For example, voice authentication platform 102, first user device 104, enterprise user device 106, and second user device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of voice authentication platform 102, first user device 104, enterprise user device 106, and second user device 108, may, in some instances, be special-purpose computing devices configured to perform specific functions.

Referring to FIG. 1B, voice authentication platform 102 may include one or more processors 111, memory 112, and communication interface 113. A data bus may interconnect processor 111, memory 112, and communication interface 113. Communication interface 113 may be a network interface configured to support communication between voice authentication platform 102 and one or more networks (e.g., network 101, or the like). Communication interface 113 may be communicatively coupled to the processor 111. Memory 112 may include one or more program modules having instructions that, when executed by processor 111, cause voice authentication platform 102 to perform one or more functions described herein and/or one or more databases that may store and/or otherwise maintain information which may be used by such program modules and/or processor 111. In some instances, the one or more program modules and/or databases may be stored by and/or maintained in different memory units of voice authentication platform 102 and/or by different computing devices that may form and/or otherwise make up voice authentication platform 102. For example, memory 112 may have, host, store, and/or include voice authentication module 112a, voice authentication database 112b, and machine learning engine 112c.

Voice authentication module 112a may have instructions that direct and/or cause voice authentication platform 102 to perform voice authentication. Voice authentication database 112b may have instructions causing voice authentication platform 102 to store voice information, voice samples, and user profiles (that may, e.g., be used to perform voice authentication). Machine learning engine 112c may contain or include instructions causing voice authentication platform 102 to train, implement, and/or update a voice authentication model (that may, e.g., be used to perform voice authentication). In some instances, machine learning engine 112c may be used by voice authentication platform 102 and/or voice authentication module 112a to refine and/or otherwise update methods for voice authentication, and/or other methods described herein.

Figure 2A:
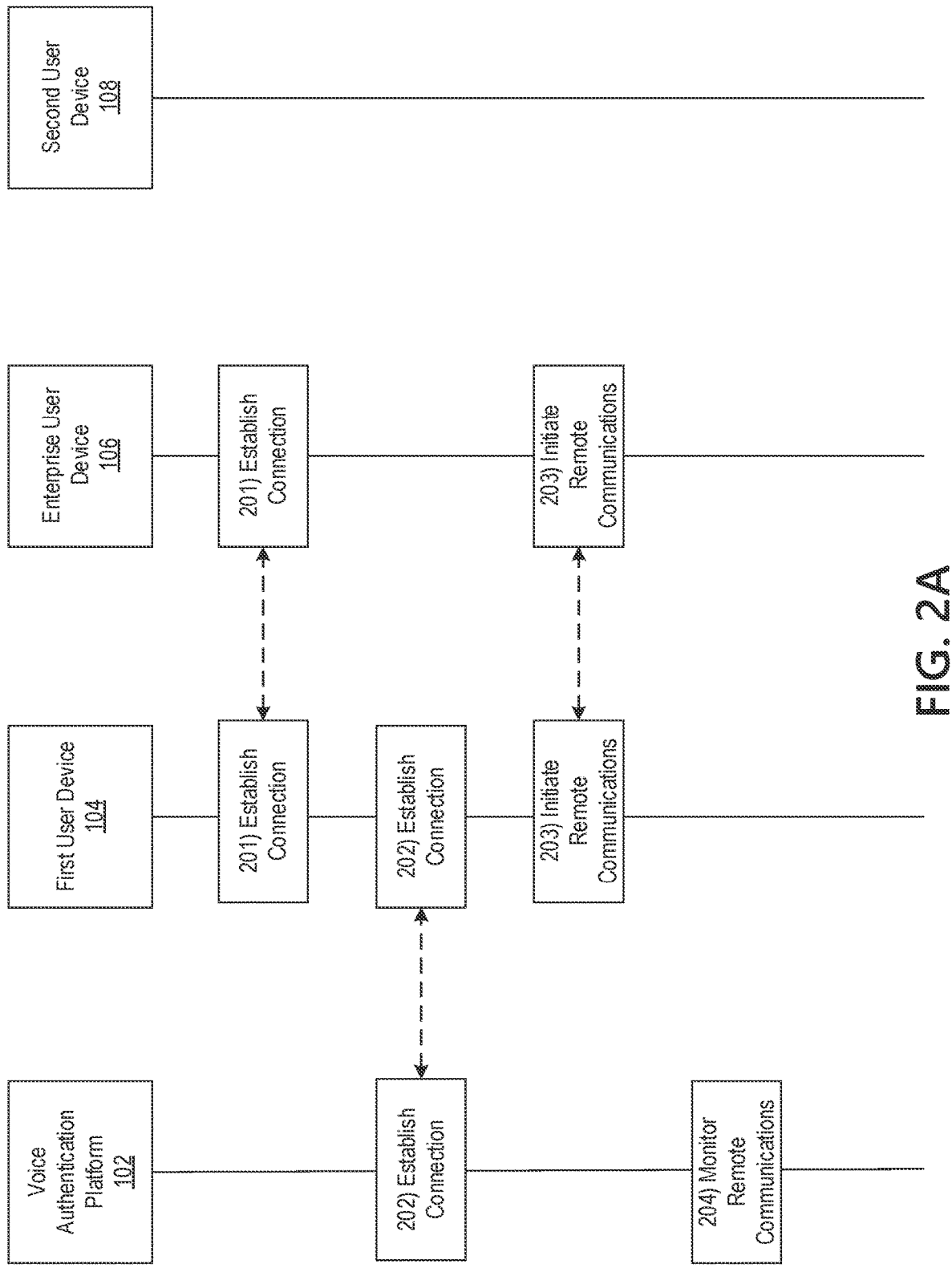

FIGS. 2A-2F depict an illustrative event sequence for proxy worker detection using voice authentication in accordance with one or more example embodiments. Referring to FIG. 2A, at step 201, the first user device 104 may establish a connection with the enterprise user device 106. For example, first user device 104 may establish a first wireless data connection with the enterprise user device 106 to link the enterprise user device 106 with the first user device 104 (e.g., in preparation for initiating remote communications). In some instances, the first user device 104 may identify whether or not a connection is already established with the enterprise user device 106. If a connection is already established with the enterprise user device 106, the first user device 104 might not re-establish the connection. If a connection is not yet established with the enterprise user device 106, the first user device 104 may establish the first wireless data connection as described above.

At step 202, voice authentication platform 102 may establish a connection with first user device 104. For example, voice authentication platform 102 may establish a second wireless data connection with the first user device 104 to link the first user device 104 with the voice authentication platform 102 (e.g., in preparation for monitoring remote communications). In some instances, the voice authentication platform 102 may identify whether or not a connection is already established with the first user device 104. If a connection is already established with the first user device 104, the voice authentication platform 102 might not re-establish the connection. If a connection is not yet established with the first user device 104, the voice authentication platform 102 may establish the second wireless data connection as described above.

At step 203, the first user device 104 may initiate remote communications with the enterprise user device 106 (e.g., via the first wireless data connection). For example, the first user device 104 may establish a remote communication between the first user and the enterprise user (e.g., a video call, a remote conferencing session, a telephone call, and/or other remote interactions). For example, the first user device 104 may use a video conferencing application to establish a remote, virtual call session between the first user and the enterprise user (e.g., for a job interview, and/or other purposes). Note that in some examples, the enterprise user device 106 may initiate the remote communications with the first user device 104 instead, in the manner described above. In some instances, the first user and the enterprise user may both be associated with an enterprise organization (e.g., a financial institution, and/or other institution) that corresponds to the enterprise user device 106. For example, the first user and the enterprise user may both be employees of the enterprise organization. In other instances, the first user may be a potential employee of the enterprise organization (e.g., an individual being interviewed by an enterprise user at the enterprise organization for a position at the enterprise organization.

At step 204, the voice authentication platform 102 may monitor remote communications. For example, the voice authentication platform 102 may monitor the remote communications between the first user device 104 and the enterprise user device 106. The voice authentication platform 102 may monitor the remote communications via the communication interface 113 and while the second wireless data connection is established. In monitoring the remote communications, voice authentication platform 102 may gather (e.g., with permission of the user(s)) voice information corresponding to the first user. For example, the voice authentication platform 102 may gather examples of the first user's voice (e.g., digital captures, recordings, and/or other examples). The voice authentication platform 102 may identify a first voice sample based on the gathered examples of the first user's voice. In some instances, in gathering the examples of the first user's voice, the voice authentication platform 102 may extract the examples from the remote communications without further input from the first user (e.g., after receiving permission of the first user). Additionally or alternatively, in some examples, the voice authentication platform 102 may prompt the first user to recite a specific phrase or word. The voice authentication platform 102 may gather an example of the first user's voice based on the recited specific phrase or word. In some instances, the voice authentication platform 102 may store the examples of the first user's voice in internal memory of the voice authentication platform 102, and/or external memory.

Figure 2B:
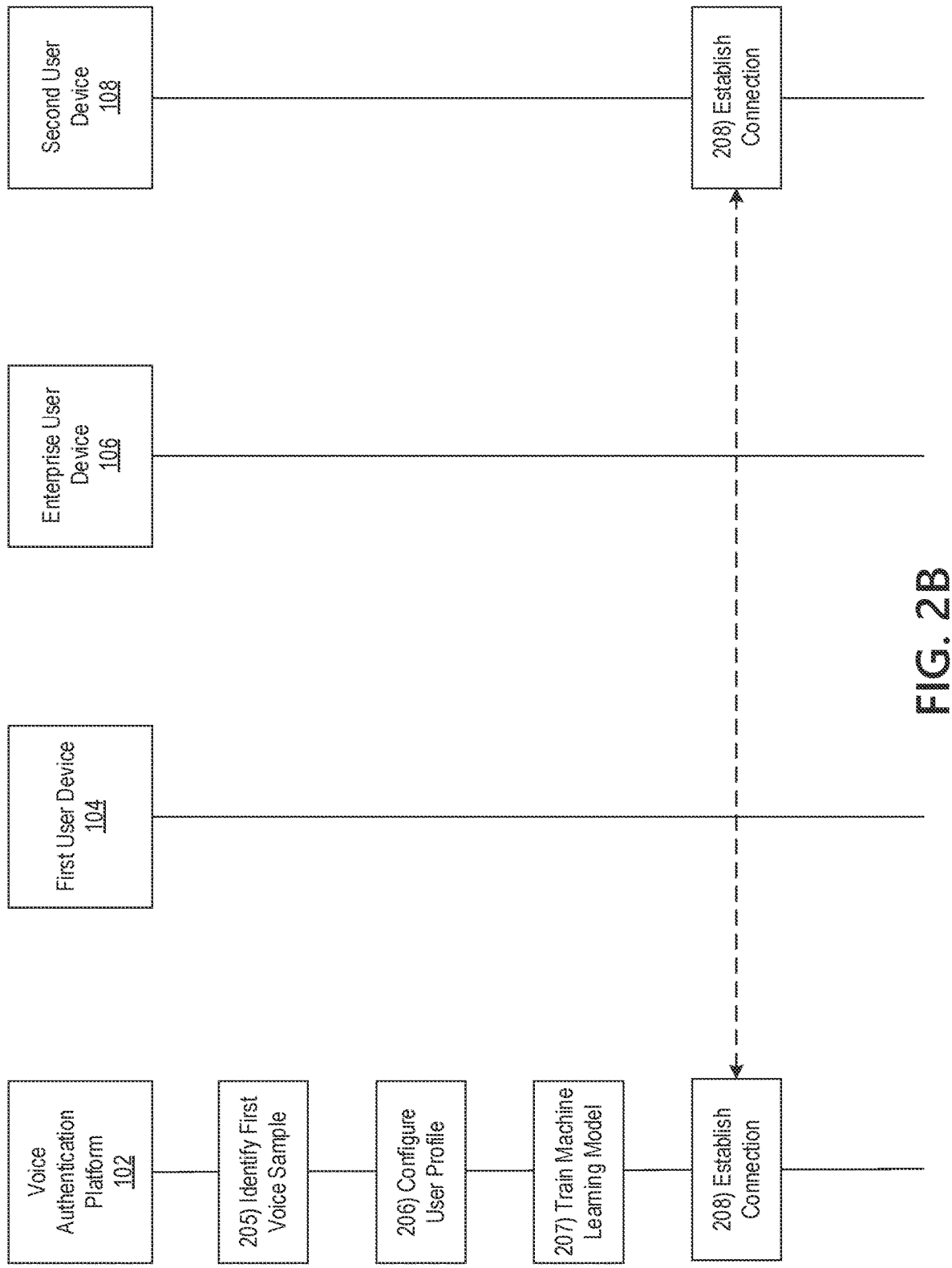

Referring to FIG. 2B, at step 205, the voice authentication platform 102 may identify a first voice sample. In identifying the first voice sample, the voice authentication platform 102 may select one or more of the examples of the first user's voice gathered at step 204 to form the first voice sample. In some instances, the voice authentication platform 102 may select the one or more examples of the first user's voice based on variations in features of the examples (e.g., voice quality, intonation, pitch, articulation rate, rhythm, vowel features, consonantal features, speech impediments, non-linguistic features, and/or other features). For example, the voice authentication platform 102 may identify that the first user's voice varied in pitch across three different examples of the first user's voice. In this example, the voice authentication platform 102 may combine all three different examples of the first user's voice into the first voice sample.

At step 206, the voice authentication platform 102 may configure a user profile corresponding to the first user. The voice authentication platform 102 may configure the user profile based on information of the first user. For example, the voice authentication platform 102 may configure the user profile to maintain a record of the user's employment information (e.g., application history, resumes, employee reports, personal identifiers, workplace identifiers, and/or other information). In configuring the user profile, the voice authentication platform 102 may link the first voice sample identified at step 205 to the user profile. For example, the first voice sample may include and/or be configured to include a digital signature that corresponds to the user profile.

In some instances, in configuring the user profile, the voice authentication platform 102 may compare the user profile to one or more additional user profiles (e.g., a second user profile). Based on comparing the user profile to one or more additional user profiles, the voice authentication platform 102 may identify a duplicate profile. For example, a second user profile may correspond to a second user and include one or more corresponding voice samples. Comparing the user profile to the second user profile may include identifying a match between one or more voice samples corresponding to the user profile and one or more voice samples corresponding to the second user profile. Based on identifying that the second user profile corresponds to the first user, the voice authentication platform 102 may identify the second user profile as a duplicate profile. In these examples, based on identifying the duplicate profile, voice authentication platform 102 may delete the duplicate profile. Based on identifying that the second user profile corresponds to a user different from the first user (e.g., a second user) the voice authentication platform 102 may maintain the second user profile and proceed to train a voice authentication model (e.g., as described below at step 207).

Additionally or alternatively, in some examples, the voice authentication platform 102 may, after a period of time, request an updated voice sample from the first user. The period of time may be a predetermined value based on the user profile and generated when the user profile is configured. For example, the voice authentication platform 102 may determine the value of the period of time (e.g., after one year of employment, and/or other periods of time) when configuring the user profile and may include the value of the period of time in the user profile. In these examples, after the period of time and based on the updated voice sample, the voice authentication platform 102 may replace, merge, and/or otherwise update the first voice sample with the updated voice sample. In these instances, the voice authentication platform 102 may reconfigure the user profile to include the update to the first voice sample. In doing so, the voice authentication platform 102 may account for changes in voice that may occur for a given user over time (which may, e.g., improve user identification by avoiding errors caused by comparing a user's voice to an outdated voice sample).

At step 207, the voice authentication platform 102 may train a voice authentication model to output similarity scores indicating a degree of similarity between voice samples and the user profile. In some instances, the voice authentication platform 102 may configure and/or otherwise train the voice authentication model based on the first voice sample and/or other historical voice samples. In some instances, to configure and/or otherwise train the voice authentication model, the voice authentication platform 102 may process the first voice sample by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the voice authentication platform 102 may train the voice authentication model to output similarity scores indicating a degree of similarity between a particular voice sample and the voice sample or samples linked to the user profile (e.g., the first voice sample, and/or other voice samples).

For example, in configuring and/or otherwise training the voice authentication model, the voice authentication platform 102 may input the first voice sample into the voice authentication model. Based on inputting the first voice sample into the voice authentication model, the voice authentication model may identify features of the first voice sample (e.g., voice quality, intonation, pitch, articulation rate, rhythm, vowel features, consonantal features, speech impediments, non-linguistic features, and/or other features). For example, the voice authentication platform 102 may identify that the first voice sample contains a particular feature (e.g., a non-linguistic feature, such as consistent throat clearing, pausing at consistent intervals, and/or other non-linguistic features). The voice authentication platform 102 may train the voice authentication model to output a higher similarity score when the same feature is identified in other voice samples (e.g., by storing a correlation between the feature and the first voice sample).

At step 208, the voice authentication platform 102 may establish a connection with second user device 108. For example, voice authentication platform 102 may establish a third wireless data connection with the second user device 108 to link the second user device 108 with the voice authentication platform 102 (e.g., in preparation for monitoring remote communications). In some instances, the voice authentication platform 102 may identify whether or not a connection is already established with the second user device 108. If a connection is already established with the second user device 108, the voice authentication platform 102 might not re-establish the connection. If a connection is not yet established with the second user device 108, the voice authentication platform 102 may establish the third wireless data connection as described above. In some instances, the second user device 108 may be a same device as first user device 104. In these instances, a connection may already be established between the voice authentication platform 102 and the second user device 108. In these instances, the voice authentication platform 102 may not re-establish the connection.

Referring to FIG. 2C, at step 209, the voice authentication platform 102 may continuously monitor the second user device 108. For instance, the voice authentication platform 102 may monitor one or more remote communications of the second user device 108 (e.g., video calls, virtual conferences, telephone calls, and/or other remote communications). The voice authentication platform 102 may monitor the remote communications via the communication interface 113 and while the third wireless data connection is established. In monitoring the remote communications, voice authentication platform 102 may continuously gather (e.g., with user permission) voice information corresponding to the second user. For example, the voice authentication platform 102 may gather examples of the second user's voice (e.g., digital captures, recordings, and/or other examples, with the second user's permission) and/or request the input of a particular voice sample (e.g., prompt for a particular word or phrase to be recited). Based on the gathered examples of the second user's voice, the voice authentication platform 102 may identify a second voice sample. In some instances, the voice authentication platform 102 may store the examples of the second user's voice in in internal memory of the voice authentication platform 102, and/or external memory.

At step 210, the voice authentication platform 102 may identify a second voice sample. In identifying the second voice sample, the voice authentication platform 102 may select one or more of the examples of the second user's voice gathered at step 209 to form the second voice sample. In some instances, the voice authentication platform 102 may select the one or more examples of the second user's voice based on variations in features of the examples of the second user's voice (e.g., voice quality, intonation, pitch, articulation rate, rhythm, vowel features, consonantal features, speech impediments, non-linguistic features, and/or other features). For example, the voice authentication platform 102 may identify that the second user's voice included a speech impediment (e.g., a stutter, and/or other speech impediments) in a majority of the examples of the second user's voice. In this example, the voice authentication platform 102 may condense that majority of the examples of the second user's voice into the second voice sample.

At step 211, the voice authentication platform 102 may input the second voice sample into the voice authentication model which may, e.g., be configured to generate a similarity score (e.g., a first similarity score). In generating the similarity score, the voice authentication model may compare the first voice sample to the second voice sample. In some instances, the similarity score may be based on one or more features of the first voice sample and of the second voice sample (e.g., voice quality, intonation, pitch, articulation rate, rhythm, vowel features, consonantal features, speech impediments, non-linguistic features, and/or other features). For example, inputting a second voice sample with a pitch corresponding to a frequency of 100 hertz (Hz) and comparing it to a first voice sample with a pitch corresponding to a frequency of 200 Hz may cause the voice authentication model to generate a lower similarity score than the similarity score generated in response to the input of a second voice sample with a pitch corresponding to a frequency of 180 Hz.

In generating the similarity score, the voice authentication model may generate the similarity score as an integer value, percentage value, decimal value, hexadecimal value, binary value, and/or other representations of the similarity score. In some examples, the voice authentication platform 102 may have previously trained the voice authentication model to employ a similarity score algorithm to determine the similarity score. In some instances, the similarity score algorithm may use some or all of the information included in the first voice sample and in the second voice sample. For example, the voice authentication model may execute the similarity score algorithm using the following constraints/parameters:

If |first voice sample pitch frequncy − second voice sample pitch frequency| ≥ 10 Hz,

-continued
then similarity score > 0. If else, then similarity score ≤ 0.

It is noted that this represents only a single exemplary set of constrains/parameters, and in other examples the similarity score algorithm may compare one or more different features of the first voice sample and of the second voice sample and may use one or more different constrains/parameters.

Additionally or alternatively, in some instances, based on comparing the first voice sample to the second voice sample, the voice authentication model may calculate an aggregate of similarity scores indicating a numerical likelihood that the first voice sample and the second voice sample correspond to a same individual. In these instances, the similarity score may be based on the aggregate of similarity scores (e.g., the aggregate of similarity scores may be or replace the similarity score). The aggregate of similarity scores may be calculated based on comparing corresponding features of the first voice sample and of the second voice sample (e.g., voice quality, intonation, pitch, articulation rate, rhythm, vowel features, consonantal features, speech impediments, non-linguistic features, and/or other features). In some examples, the voice authentication platform 102 may have previously trained the voice authentication model to employ an aggregate algorithm similar to the similarity score algorithm described above in order to determine the aggregate of similarity scores. In some instances, the aggregate algorithm may use some or all of the information included in the first voice sample and in the second voice sample. For example, the voice authentication model may execute the following aggregate algorithm:

Aggregate of Similarity Scores =

(Similarity % of Feature 1 + Similarity % of Feature 2 + ... +

Similarity % of Feature $N$) $* \dfrac{1}{\text{Number of Features}(N)}$.

In some instances, calculating the aggregate of similarity scores may further include identifying sample population features and comparing the corresponding features of the first voice sample and of the second voice sample to the sample population features. In these instances, identifying the sample population features may include analyzing voice samples from a plurality of additional users other than the first user and the second user. In some examples, the plurality of additional users may be coworkers of the first user (e.g., at an enterprise organization, such as a financial institution and/or other institution). For example, the voice authentication platform 102 may access the population of voice samples (e.g., voice samples stored in an employee database corresponding to employees of the enterprise organization, voice samples stored in memory of an enterprise user device (e.g., enterprise user device 106), voice samples stored in memory of the voice authentication platform 102, and/or other populations of voice samples). The voice authentication platform 102 may then use the voice authentication model to identify the sample population features by analyzing the features of each voice sample in the population of voice samples. For example, the voice authentication model may identify that the average pitch frequency of the population of voice samples is 190 Hz.

In these instances, the voice authentication platform 102 may then compare the corresponding features of the first voice sample and of the second voice sample to the sample population features (e.g., by using the voice authentication model). Based on the comparison, the voice authentication platform 102 may update the aggregate of similarity scores. For example, if the voice authentication model identifies that a sample population feature (e.g., articulation rate, and/or other features) and the corresponding feature of the first voice sample are more similar than the corresponding features of the first voice sample and of the second voice sample, then the aggregate of similarity scores may be decreased, indicating that it is less likely the first voice sample and the second voice sample correspond to a same user (e.g., the first user and the second user are employees of an enterprise organization, the first user is an authorized participant in the remote communications, and the second user is an unauthorized participant in the remote communications impersonating the first user). Conversely, if the voice authentication model identifies that a sample population feature (e.g., articulation rate, and/or other features) and the corresponding feature of the first voice sample are less similar than the corresponding features of the first voice sample and of the second voice sample, then the aggregate of similarity scores may be increased, indicating that it is more likely the first voice sample and the second voice sample correspond to a same user.

At step 212, the voice authentication platform 102 may compare the similarity score (e.g., the first similarity score, and/or other similarity scores) to a threshold value. The threshold value may be used to identify whether or not the similarity score meets or exceeds the threshold value. For example, a threshold value may be or have an integer value of 5. Identifying that the similarity score meets or exceeds the threshold value may indicate that the second voice sample and the first voice sample correspond to a same user and that the voice authentication platform 102 should update the user profile based on the second voice sample. Identifying that the similarity score does not meet or exceed the threshold value (i.e., the similarity score is below the threshold value) may indicate that the second voice sample and the first voice sample correspond to different users and that the voice authentication platform 102 should initiate a security action. In some examples, the threshold value may be a value determined by an enterprise user (e.g., the enterprise user of enterprise user device 106, and/or other enterprise users). In comparing the similarity score to the threshold value, the voice authentication platform 102 may identify whether the similarity score meets or exceeds the threshold value. For example, a threshold value may have or be a value of 80%, while the similarity score may have or be a value of 90%. The voice authentication platform 102 may then identify that the similarity score exceeds the threshold value.

In some examples, based on identifying that the similarity score meets or exceeds the threshold value, the voice authentication platform 102 may identify that the user profile should be updated based on the second voice sample. In these examples, the voice authentication platform 102 may update the user profile based on the second voice sample (e.g., as described below at step 213). In some examples, based on or in response to identifying that the similarity score meets or exceeds the threshold value, the voice authentication platform 102 may additionally send a risk notification to an enterprise user device (e.g., enterprise user device 106, and/or other enterprise user devices). The risk notification may be or include information indicating a comparison was performed. For example, the voice authentication platform 102 may send a risk notification indicating that the second voice sample exceeded the threshold value by less than a predetermined percentage, indicating a potential unauthorized access attempt. The risk notification may also provide an option for manual user review. For example, in receiving the risk notification, the enterprise user may make a user determination that the second voice sample did not exceed the threshold value by a sufficient percentage, and the enterprise user may manually initiate a security action. In instances where the similarity score does meet or exceed the threshold value, the voice authentication platform 102 may proceed to step 213.

In some instances, based on identifying that the similarity score does not meet or exceed the threshold value, the voice authentication platform 102 may identify that a security action should be initiated. In these instances, the voice authentication platform 102 may proceed to step 214 and initiate the security action as described below at steps 214-222.

Figure 2D:
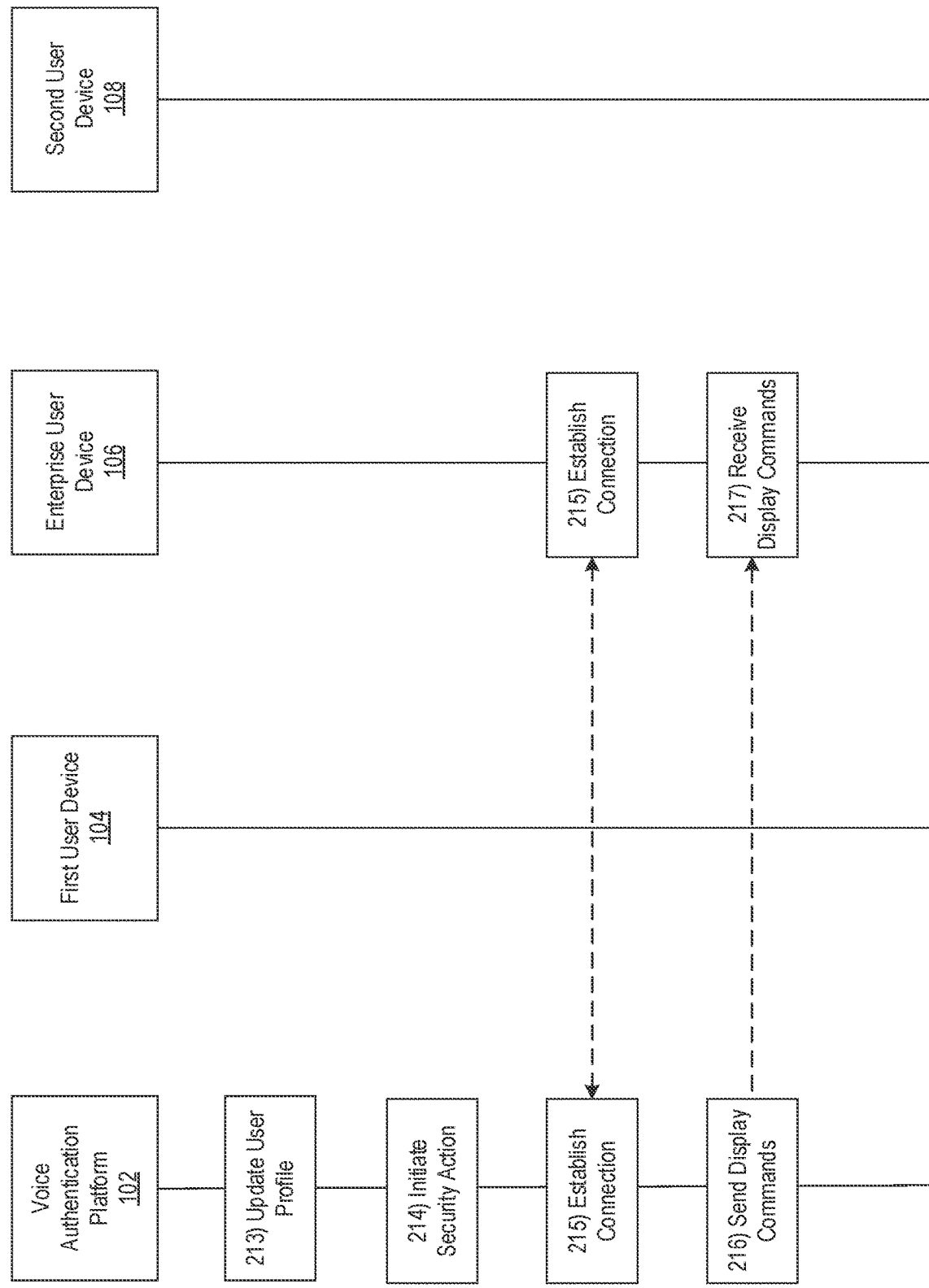

Referring to FIG. 2D, at step 213, based on or in response to identifying that the similarity score meets or exceeds the threshold value, the voice authentication platform 102 may update the user profile based on the second voice sample. For example, the voice authentication platform 102 may merge, condense, and/or otherwise combine the second voice sample with the first voice sample. Additionally or alternatively, in some instances the voice authentication platform 102 may reconfigure the user profile to include both the second voice sample and the first voice sample. For example, in reconfiguring the user profile, the voice authentication platform 102 may link the second voice sample to the user profile. For example, the second voice sample may include a digital signature that corresponds to the user profile.

At step 214, based on or in response to identifying that the similarity score does not meet or exceed the threshold value, the voice authentication platform 102 may initiate a security action. For example, in initiating the security action, the voice authentication platform 102 may initiate one or more of: revoking access of a user device (e.g., the second user device 108) to an enterprise network, deleting the user profile, removing a user device from a list of authorized devices, removing the second user from a list of authorized users, changing a password corresponding to the second user, and/or other security actions.

Additionally or alternatively, in some examples initiating the security action may include the voice authentication platform 102 requesting a confirmation voice sample corresponding to the second user from the second user device 108. For instance, the voice authentication platform 102 may request the confirmation voice sample based on identifying that the similarity score failed to meet or exceed the threshold value by less than a particular amount. For example, the threshold value may have or have been a value of 80%, while the similarity score may have or have been a value of 75%. The voice authentication platform 102 may identify that the similarity score failed to meet or exceed the threshold value by less than 10% and the voice authentication platform 102 may then request the confirmation voice sample. Based on or in response to the request for the confirmation voice sample, the second user device 108 may prompt and/or otherwise request the second user to provide the confirmation voice sample. The voice authentication platform 102 may then receive the confirmation voice sample from the second user device 108. The confirmation voice sample may comprise a vocal key (e.g., a spoken code, phrase, password, and/or other vocal key). In some examples, the vocal key may be or include a randomly generated code. Additionally or alternatively, in some instances the vocal key may be or include one or more terms selected by the enterprise user (e.g., the user of enterprise user device 106).

Based on or in response to receiving the confirmation voice sample, the voice authentication platform 102 may repeat the actions described above at steps 211-213 using the confirmation voice sample. For example, the voice authentication platform 102 may input the confirmation voice sample into the voice authentication model. The voice authentication platform 102 may generate a second similarity score corresponding to the confirmation voice sample using the voice authentication model. In generating the second similarity score, the voice authentication platform 102 may compare the first voice sample to the confirmation voice sample, in the manner described above at step 211. The voice authentication platform 102 may then compare the second similarity score to the threshold value, in the manner described above at step 212, and identify a confirmation result based on the comparison. Based on a confirmation result identifying that the second similarity score meets or exceeds the threshold value, the voice authentication platform 102 may update the user profile based on the confirmation voice sample, as described above at step 213. Based on a confirmation result identifying that the second similarity score meets or exceeds the threshold value, the voice authentication platform 102 may initiate a security action (e.g., revoking access of a user device to an enterprise network, deleting the user profile, removing a user device from a list of authorized devices, removing the second user from a list of authorized users, changing a password corresponding to the second user, and/or other security actions).

Additionally or alternatively, in some instances, the voice authentication platform 102 may previously have integrated, via a wireless network connection, a conferencing software program (e.g., a video conferencing program, a remote calling program, an intra-office meeting program, and/or other conferencing software programs) with the voice authentication platform 102. In these instances, in initiating the security action, the voice authentication platform 102 may remove a user device (e.g., the second user device 108) from a conference hosted by the conferencing software program.

Note that while this illustrative event sequence describes the steps occurring in sequence, in some instances, the voice authentication platform 102 may perform the steps described below at steps 215-221 concurrent with, or prior to, to initiating any security action.

At step 215, the voice authentication platform 102 may establish a connection with enterprise user device 106. For example, voice authentication platform 102 may establish a fourth wireless data connection with the enterprise user device 106 to link the enterprise user device 106 with the voice authentication platform 102 (e.g., in preparation for sending display commands). In some instances, the voice authentication platform 102 may identify whether or not a connection is already established with the enterprise user device 106. If a connection is already established with the enterprise user device 106, the voice authentication platform 102 might not re-establish the connection. If a connection is not yet established with the enterprise user device 106, the voice authentication platform 102 may establish the fourth wireless data connection as described above.

At step 216, the voice authentication platform 102 may send one or more commands directing the enterprise user device 106 to display a user interface (e.g., an authentication result interface). For example, the voice authentication platform 102 may send the one or more commands directing the enterprise user device 106 to display the user interface via the communication interface 113 and while the fourth wireless data connection is established.

At step 217, the enterprise user device 106 may receive the one or more commands directing the enterprise user device 106 to display the user interface from the voice authentication platform 102. For example, the enterprise user device 106 may receive the one or more commands directing the enterprise user device 106 to display the user interface from the voice authentication platform 102 via the communication interface 113 and while the fourth wireless data connection is established.

Figure 2E:
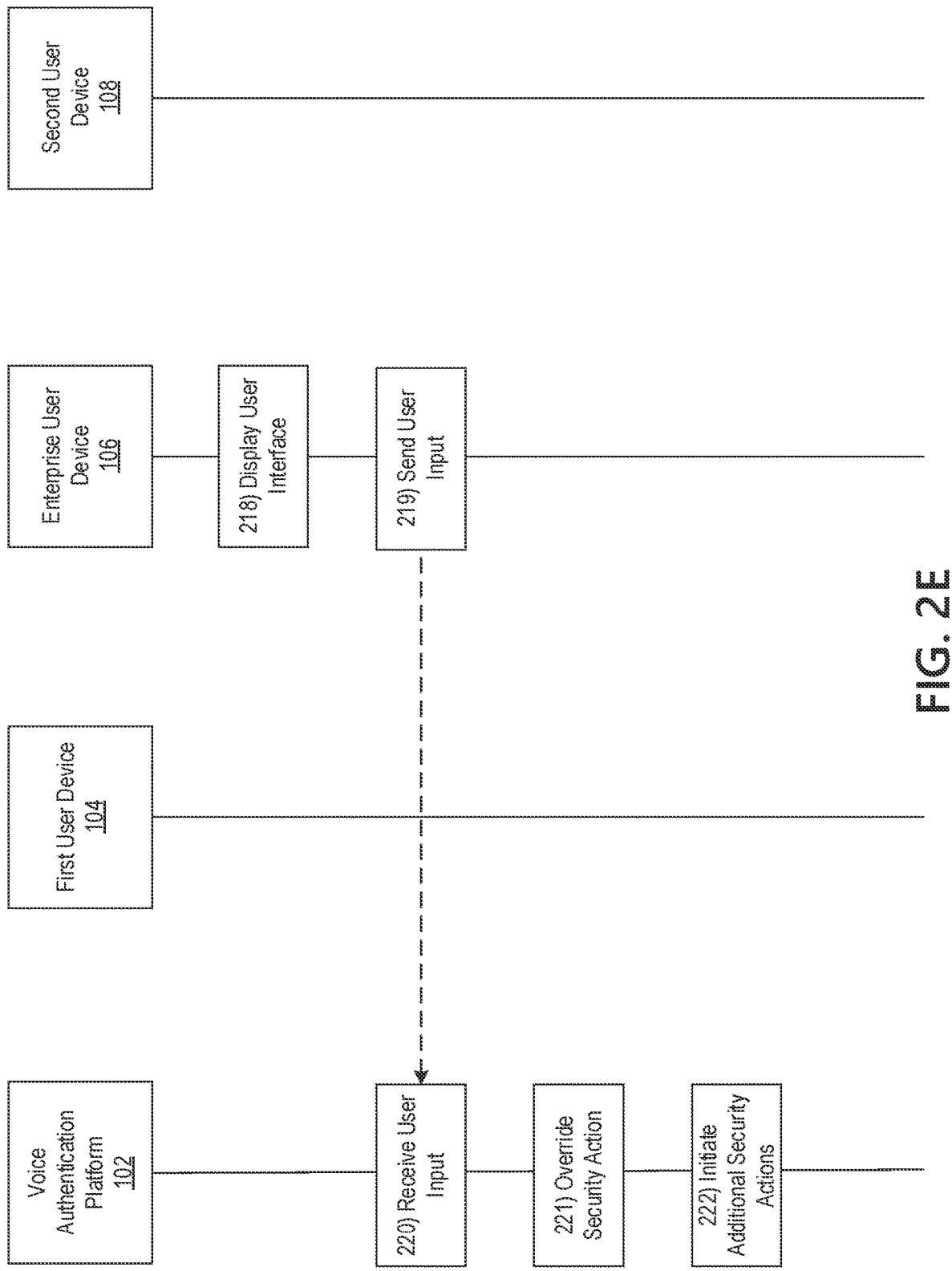

Referring to FIG. 2E, at step 218, based on or in response to the one or more commands to display the user interface, the enterprise user device 106 may display the user interface. For example, the enterprise user device 106 may display an authentication result interface. In some instances, the authentication result interface may be configured to receive user input through the enterprise user device 106.

Figure 3A:
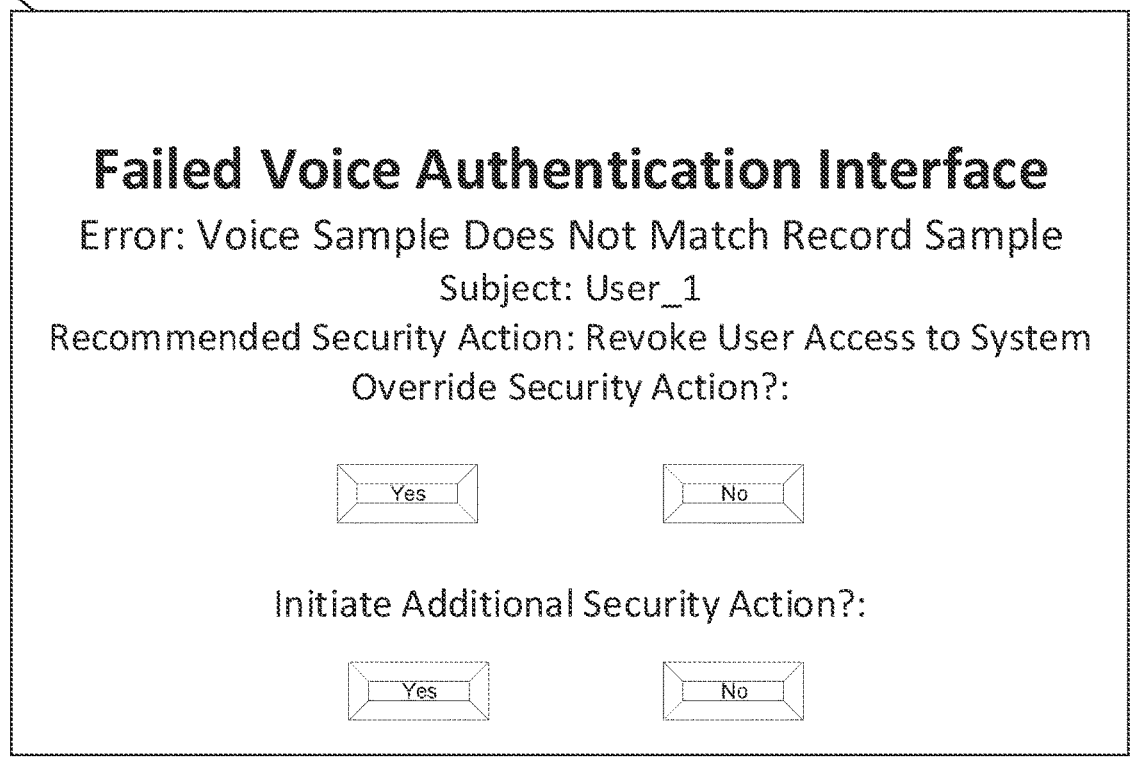
FIGS. 3A-3C depict illustrative graphical user interfaces depicting AI-supported proxy worker detection using voice authentication in accordance with one or more example embodiments.

For example, in displaying an authentication result interface, the enterprise user device 106 may display a graphical user interface similar to failed voice authentication interface 300, which is illustrated in FIG. 3A. Referring to FIG. 3A, in some instances, the failed voice authentication interface 300 may include information corresponding to the authentication result. For example, the failed voice authentication interface 300 may include information such as an error message, an identifier for the second user, a recommended security action, an implemented security action, and/or other information. The failed voice authentication interface 300 may also display input mechanisms or selectable options requesting user input. For example, the failed voice authentication interface 300 may display one or more of: a button or buttons, toggle or toggles, check box or boxes, and/or other interface elements. For example, as illustrated in FIG. 3A, the input mechanisms may be buttons the user can select to decide whether or not to override a security action, and/or buttons the user can select to decide whether or not to initiate additional security actions. In some instances, based on user input directing the enterprise user device 106 to override the security action, the enterprise user device 106 may send one or more commands directing the voice authentication platform 102 to override the security action (e.g., as described below at step 221). In some examples, based on user input directing the enterprise user device 106 to initiate additional security actions, the enterprise user device 106 may send one or more commands directing the voice authentication platform 102 to initiate additional security actions (e.g., as described below at step 222).

Figure 3B:
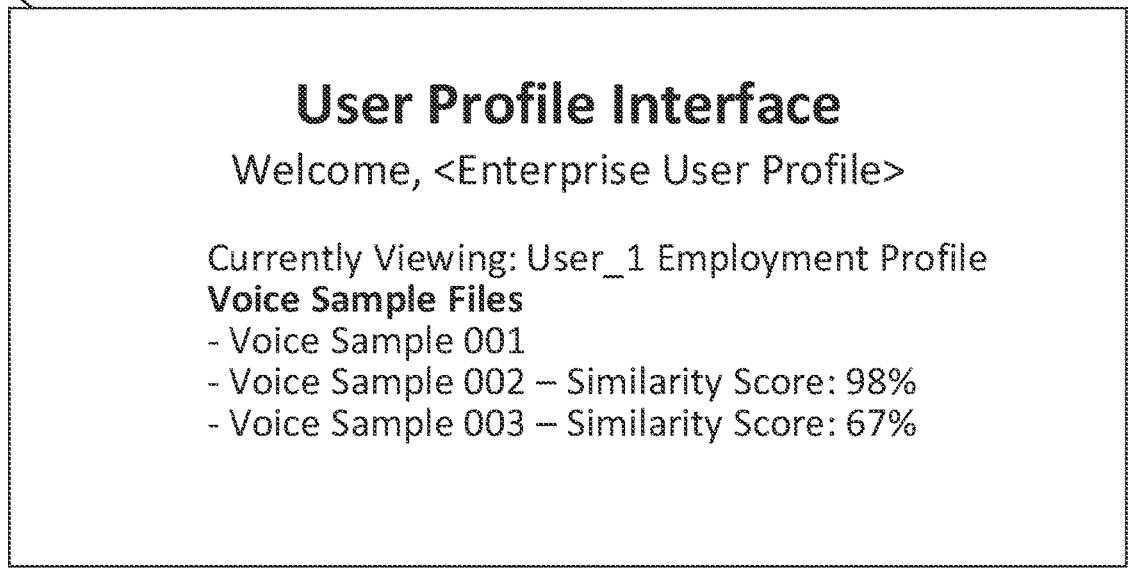

Additionally or alternatively, based on or in response to the one or more commands to display the user interface, the enterprise user device 106 may display a user profile interface. For example, in displaying a user profile interface, the enterprise user device 106 may display a graphical user interface similar to user profile interface 310, which is illustrated in FIG. 3B. The user profile interface may correspond to the user profile corresponding to the second user. Referring to FIG. 3B, in some instances, the user profile interface 310 may include information corresponding to the user profile. For example, the user profile interface 310 may include information such as an identifier for the user profile (e.g., an identifier indicating which user the profile corresponds to, such as the second user), one or more voice samples (e.g., the second voice sample, the first voice sample, and/or other voice samples), similarity scores corresponding to the voice samples, and/or other information.

Figure 3C:
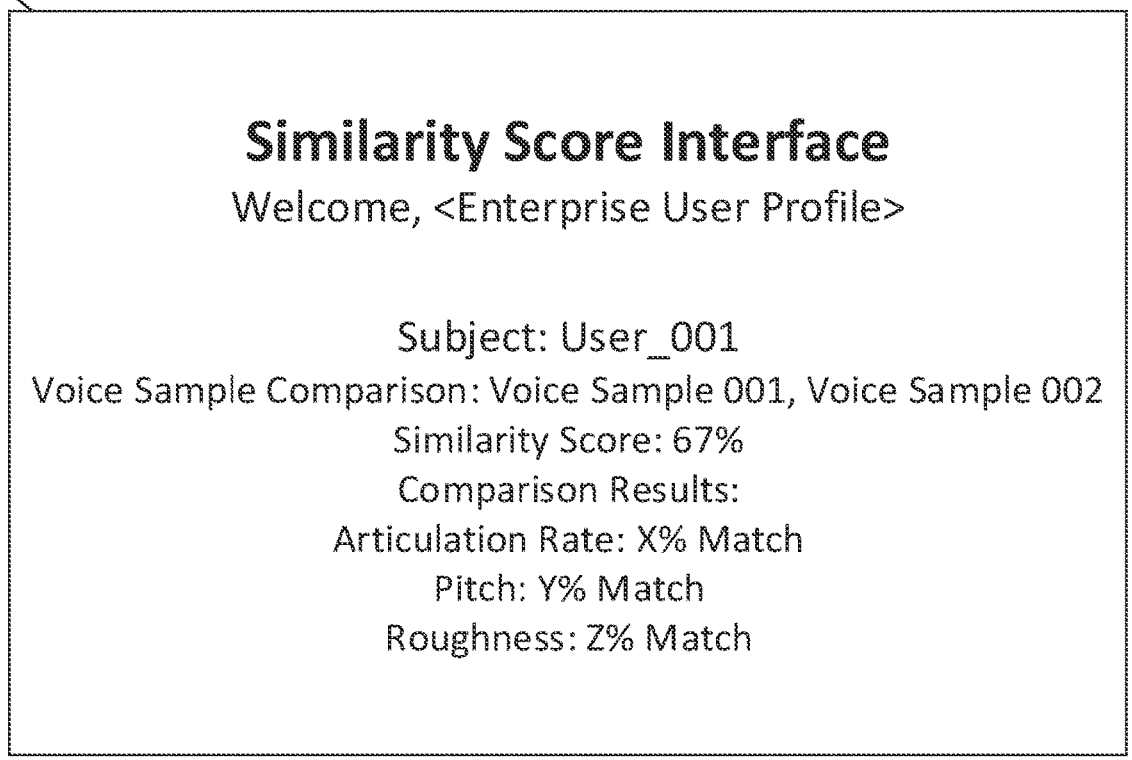

Additionally or alternatively, based on or in response to the one or more commands to display the user interface, the enterprise user device 106 may display a similarity score interface. For example, in displaying the similarity score interface, the enterprise user device 106 may display a graphical user interface similar to similarity score interface 320, which is illustrated in FIG. 3C. Referring to FIG. 3C, in some instances, the similarity score interface 320 may include information corresponding to the similarity score. For example, the similarity score interface 320 may include information such as the user the similarity score corresponds to (e.g., the second user), which voice samples were compared to generate the similarity score (e.g., the first voice sample and the second voice sample), the similarity score and/or the aggregate of similarity scores, the features of the voice samples used to calculate the similarity score, and/or other information.

With further reference to FIG. 2E, at step 219, based on or in response to receiving user input (e.g., as described at step 218 above), the enterprise user device 106 may send the user input to the voice authentication platform 102. For example, in some instances, based on user input directing the enterprise user device 106 to override the security action, the enterprise user device 106 may send one or more commands directing the voice authentication platform 102 to override the security action (e.g., as described below at step 221). In some examples, based on user input directing the enterprise user device 106 to initiate additional security actions, the enterprise user device 106 may send one or more commands directing the voice authentication platform 102 to initiate additional security actions (e.g., as described below at step 222). The enterprise user device 106 may send the user input via the communication interface 113 and while the fourth wireless data connection is established.

At step 220, the voice authentication platform 102 may receive the user input from the enterprise user device 106. For example, the voice authentication platform 102 may receive the user input from the enterprise user device 106 via the communication interface 113 and while the fourth wireless data connection is established.

While steps 215-220 above are described as being performed by or with enterprise user device 106, in some instances the actions performed by or on enterprise user device 106 may be performed by or on another enterprise user device different from enterprise user device 106 (e.g., a device corresponding to an administrator of the enterprise organization, and/or other enterprise user devices), but associated with the same enterprise organization.

At step 221, based on or in response to receiving user input directing the voice authentication platform 102 to override the security action, the voice authentication platform 102 may override the security action. In overriding the security action, the voice authentication platform 102 may execute one or more actions that negate the effect of the security action. For example, the voice authentication platform 102 may cancel initiation of the security action, reverse the security action, reinstate access of a user device (e.g. second user device 108) to an enterprise network, recreate the user profile, add a user device to a list of authorized devices, add the second user to a list of authorized users, rescind a password change, and/or otherwise negate the effect of the security action. In some instances, in initiating the security action at step 214, the voice authentication platform 102 may have initiated multiple security actions (e.g., revoking access for a user device (e.g., the second user device 108), removing a user device from a list of authorized devices, and/or other security actions). In these instances, based on the user input, the voice authentication platform 102 may only override a portion of the security actions. For example, the voice authentication platform 102 may have initiated three security actions, while the user input directs the voice authentication platform 102 to override only two of the three initiated security actions. In some examples, based on overriding the security action, the voice authentication platform 102 may update the user profile based on the second voice sample (e.g., as described above at step 213).

At step 222, based on or in response to receiving user input directing the voice authentication platform 102 to initiate additional security actions, the voice authentication platform 102 may initiate additional security actions. For example, in initiating the security actions, the voice authentication platform 102 may initiate one or more of: revoking access of a user device (e.g., the second user device 108) to an enterprise network, deleting the user profile, removing a user device from a list of authorized devices, removing the second user from a list of authorized users, changing a password corresponding to the second user, and/or other security actions. Additionally or alternatively, in some instances, in initiating the additional security actions the voice authentication platform 102 may request a confirmation voice sample, as described above at step 214. Additionally or alternatively, in some examples, in initiating the additional security actions, the voice authentication platform 102 may remove a user device (e.g., the second user device 108) from a conference hosted by the conferencing software program, as further described above at step 214.

Referring to FIG. 2F, at step 223, the voice authentication platform 102 may update and/or otherwise refine the voice authentication model based on the second voice sample and the similarity score. In some instances, refining the voice authentication model may include inputting the second voice sample and the similarity score into the voice authentication model. By inputting the second voice sample and the similarity score into the voice authentication model, the voice authentication platform 102 may create an iterative feedback loop that may continuously and dynamically refine the voice authentication model to improve its accuracy. For example, the voice authentication platform 102 may identify that the second voice sample received the similarity score based on a particular feature of the second voice sample (e.g., the pitch frequency, and/or other features). In these examples, the voice authentication platform 102 may refine the voice authentication model to automatically generate, in future iterations of the feedback loop and for future voice samples with equivalent features, a similarity score equivalent to the similarity score corresponding to the second voice sample. In doing so, the voice authentication platform 102 may improve accuracy and effectiveness of the similarity score generation process by the voice authentication model, which may, e.g., result in more efficient training of models trained by the voice authentication platform 102 (and may in some instances, conserve computing and/or processing power/resources in doing so).

Additionally or alternatively, the voice authentication platform 102 may monitor the second voice sample and refine the voice authentication model to dynamically modify the similarity score based on continuous monitoring of the second user device 108. For example, the second user device 108 may continue to initiate remote communications with enterprise user devices (which may, e.g., be different from enterprise user device 106). In some instances, in monitoring these remote communications, the voice authentication platform 102 may update the second voice sample. In these examples, the voice authentication platform 102 may train the voice authentication model to modify (e.g., increase or decrease) the similarity score based on the update to the second voice sample.

Figure 4:
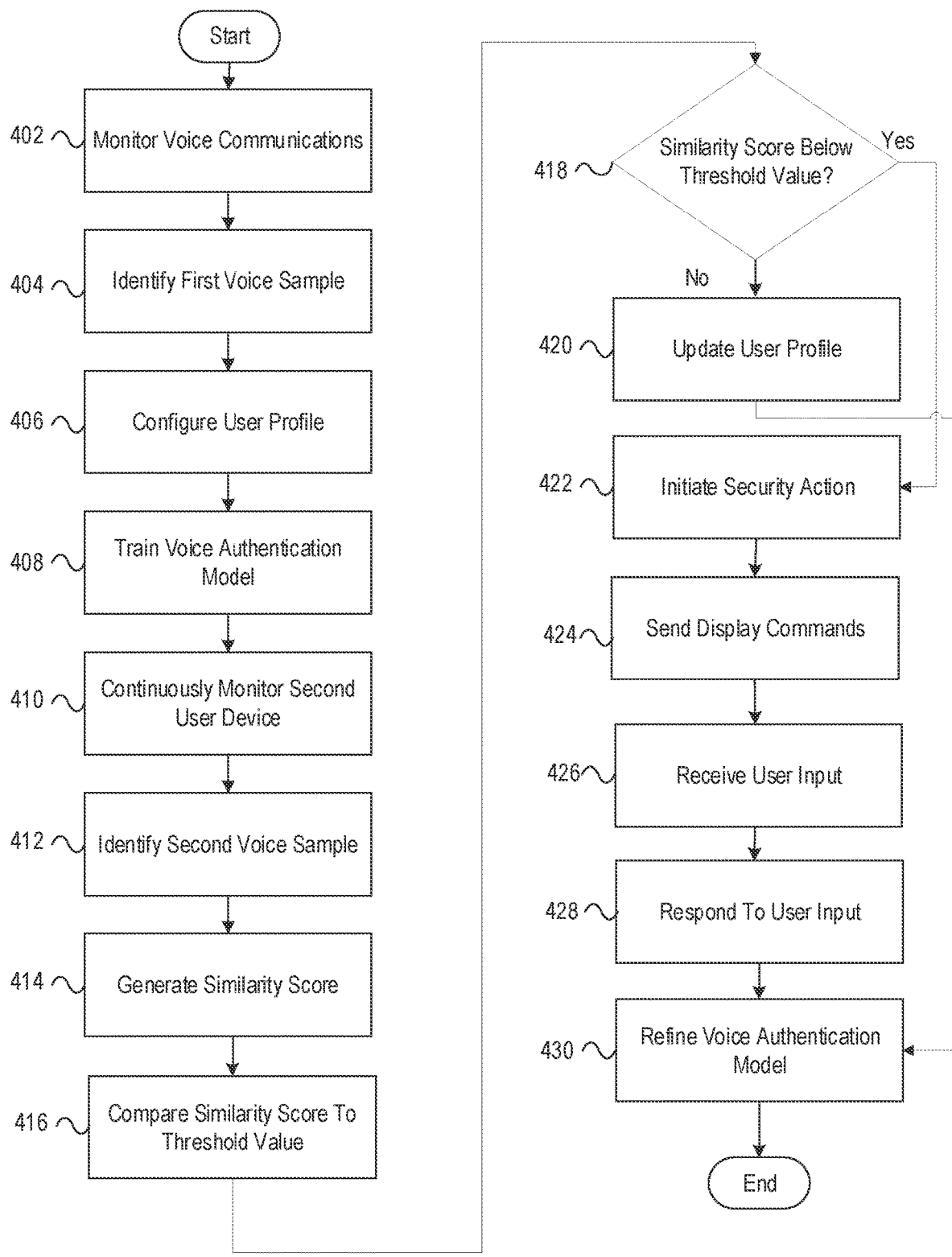
FIG. 4 depicts an illustrative method for AI-supported proxy worker detection using voice authentication in accordance with one or more example embodiments.

FIG. 4 depicts an illustrative method for proxy worker detection using voice authentication in accordance with one or more example embodiments. At step 402, a computing platform having at least one processor, a communication interface, and memory may monitor voice communications (e.g., between a first user device and an enterprise user device). At step 404, the computing platform may identify a first voice sample. At step 406, the computing platform may configure a user profile based on the first voice sample. At step 408, the computing platform may train a voice authentication model based on the first voice sample. At step 410, the computing platform may continuously monitor a second user device. At step 412, the computing platform may identify a second voice sample. At step 414, the computing platform may generate a similarity score corresponding to the second voice sample. At step 416, the computing platform may compare the similarity score to a threshold value. At step 418, the computing platform may identify whether or not the similarity score is below the threshold value. Based on identifying that the similarity score is below the threshold value, the method may progress to step 422. Based on identifying that the similarity score is not below the threshold value, the method may progress to step 420.

At step 420, the computing platform may update the user profile. Based on updating the user profile, the method may progress to step 430. At step 422, the computing platform may initiate a security action. At step 424, the computing platform may send display commands (e.g., to an enterprise user device). At step 426, the computing platform may receive user input (e.g., from the enterprise user device). At step 428, the computing platform may respond to the user input (e.g., by overriding the security action, or initiating additional security actions). At step 430, the computing platform may refine the voice authentication model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing platform comprising at least one processor, a communication interface, and memory:
   monitoring remote communications between a first user device and an enterprise user device, wherein monitoring the remote communications comprises gathering voice information corresponding to a first user;
   identifying, based on the gathered voice information corresponding to the first user, a first voice sample;
   configuring a user profile corresponding to the first user, wherein configuring the user profile comprises linking the first voice sample to the user profile;
   training, based on the first voice sample, a voice authentication model, wherein training the voice authentication model configures the voice authentication model to output similarity scores indicating a degree of similarity between voice samples and the user profile;
   monitoring a second user device, wherein monitoring the second user device comprises continuously gathering voice information corresponding to a second user;

identifying, based on the continuously gathered voice information corresponding to the second user, a second voice sample;
executing the voice authentication model using the second voice sample as input;
generating, based on executing the voice authentication model, a first similarity score corresponding to the second voice sample, wherein generating the first similarity score comprises comparing the first voice sample to the second voice sample to identify a similarity between the first voice sample and the second voice sample;
comparing the first similarity score to a threshold value;
identifying, based on the comparing, whether or not the first similarity score meets or exceeds the threshold value;
in response to identifying that the first similarity score meets or exceeds the threshold value, updating, based on the second voice sample, the user profile;
in response to identifying that the first similarity score does not meet or exceed the threshold value, initiating a security action, wherein initiating the security action comprises:
suspending access, for the second user device, to a network;
sending one or more commands to display a user interface to the enterprise user device; and
receiving, from the enterprise user device, user input, wherein the user input directs the computing platform to:
override the security action by reinstating access, for the second user device, to the network; and
initiate one or more additional security actions; and
refining the voice authentication model based on the second voice sample and the first similarity score.

2. A computing platform comprising:
at least one processor;
a communication interface communicatively coupled to the at least one processor; and
memory storing computer-readable instructions that, when executed by the at least one processor, cause the computing platform to:
monitor remote communications between a first user device and an enterprise user device, wherein monitoring the remote communications comprises gathering voice information corresponding to a first user;
identify, based on the gathered voice information corresponding to the first user, a first voice sample;
configure a user profile corresponding to the first user, wherein configuring the user profile comprises linking the first voice sample to the user profile;
train, based on the first voice sample, a voice authentication model, wherein training the voice authentication model configures the voice authentication model to output similarity scores indicating a degree of similarity between voice samples and the user profile;
monitor a second user device, wherein monitoring the second user device comprises continuously gathering voice information corresponding to a second user;
identify, based on the continuously gathered voice information corresponding to the second user, a second voice sample;
execute the voice authentication model using the second voice sample as input;
generate, based on executing the voice authentication model, a first similarity score corresponding to the second voice sample, wherein generating the first similarity score comprises comparing the first voice sample to the second voice sample to identify a similarity between the first voice sample and the second voice sample;
compare the first similarity score to a threshold value;
identify, based on the comparing, whether or not the first similarity score meets or exceeds the threshold value;
in response to identifying that the first similarity score meets or exceeds the threshold value, update, based on the second voice sample, the user profile;
in response to identifying that the first similarity score does not meet or exceed the threshold value, initiate a security action, wherein initiating the security action comprises:
suspending access, for the second user device, to a network;
sending one or more commands to display a user interface to the enterprise user device; and
receiving, from the enterprise user device, user input, wherein the user input directs the computing platform to:
override the security action by reinstating access, for the second user device, to the network; and
initiate one or more additional security actions; and
refine the voice authentication model based on the second voice sample and the first similarity score.

3. The computing platform of claim 2, wherein the security action comprises one or more of:
revoking access of a user device to an enterprise network, deleting the user profile, removing a user device from a list of authorized devices, removing the second user from a list of authorized users, or changing a password corresponding to the second user.

4. The computing platform of claim 2, wherein the one or more additional security actions comprise one or more of:
revoking access of a user device to an enterprise network, deleting the user profile, removing a user device from a list of authorized devices, removing the second user from a list of authorized users, or changing a password corresponding to the second user.

5. The computing platform of claim 2, wherein the memory stores additional computer-readable instructions that, when executed by the at least one processor, cause the computing platform to:
request, from the second user device, a confirmation voice sample corresponding to the second user, wherein the confirmation voice sample comprises a vocal key;
execute the voice authentication model using the confirmation voice sample as input;
generate, based on executing the voice authentication model, a second similarity score corresponding to the confirmation voice sample, wherein generating the second similarity score comprises comparing the first voice sample to the confirmation voice sample to identify the second similarity score;
identify, based on comparing the second similarity score to the threshold value, a confirmation result;
based on identifying that the second similarity score meets or exceeds the threshold value, update, based on the confirmation voice sample, the user profile; and based on identifying that the second similarity score does not meet or exceed the threshold value, initiate the security action.

6. The computing platform of claim 5, wherein the vocal key comprises a randomly generated code.

7. The computing platform of claim 5, wherein the vocal key comprises one or more terms selected by an enterprise user.

8. The computing platform of claim 5, wherein the memory stores additional computer-readable instructions that, when executed by the at least one processor, cause the computing platform to:
based on identifying that the second similarity score meets or exceeds the threshold value, send, to the enterprise user device, a risk notification, wherein the risk notification indicates that a comparison was performed and provides an option for manual user review.

9. The computing platform of claim 2, wherein the memory stores additional computer-readable instructions that, when executed by the at least one processor, cause the computing platform to:
continue to monitor the first user device, wherein continuing to monitor the first user device comprises continuously gathering voice information corresponding to the first user; and
identify, based on the continuously gathered voice information corresponding to the first user, the second voice sample.

10. The computing platform of claim 2, wherein the first user and the second user comprise employees of an enterprise organization, wherein the first user comprises an authorized participant in the remote communications, and wherein the second user comprises an unauthorized participant in the remote communications impersonating the first user.

11. The computing platform of claim 2, wherein the security action comprises:
integrating, via a wireless network connection, a conferencing software program with the computing platform; and
removing the second user device from a conference hosted by the conferencing software program.

12. The computing platform of claim 2, wherein the memory stores additional computer-readable instructions that, when executed by the at least one processor, cause the computing platform to:
compare the user profile to a second user profile, wherein comparing the user profile to the second user profile comprises identifying a match between one or more voice samples corresponding to the user profile and one or more voice samples corresponding to the second user profile;
identify, based on the comparing, a duplicate profile; and
delete, based on identifying the duplicate profile, the duplicate profile.

13. The computing platform of claim 2, wherein the memory stores additional computer-readable instructions that, when executed by the at least one processor, cause the computing platform to:
request, after a period of time, an updated voice sample from the first user; and
update, based on the updated voice sample, the user profile.

14. The computing platform of claim 13, wherein the period of time is a predetermined value based on the user profile and generated when the user profile is configured.

15. The computing platform of claim 2, wherein generating the first similarity score further comprises, based on comparing the first voice sample to the second voice sample, calculating an aggregate of similarity scores indicating that the first voice sample and the second voice sample correspond to a same individual.

16. The computing platform of claim 15, wherein calculating the aggregate of similarity scores comprises comparing corresponding features of the first voice sample and of the second voice sample.

17. The computing platform of claim 16, wherein the corresponding features of the first voice sample and the second voice sample comprise one or more of: voice quality, intonation, pitch, articulation rate, rhythm, vowel features, consonantal features, speech impediments, or non-linguistic features.

18. The computing platform of claim 17, wherein calculating the aggregate of similarity scores further comprises:
identifying sample population features, wherein identifying the sample population features comprises analyzing voice samples from a plurality of additional users other than the first user and the second user, wherein the plurality of additional users are coworkers of the first user; and
comparing the corresponding features of the first voice sample and of the second voice sample to the sample population features; and
updating, based on the comparing, the aggregate of similarity scores.

19. The computing platform of claim 2, wherein the user input comprises a plurality of commands, wherein the plurality of commands comprises:
a first command directing the computing platform to override the security action; and
a second command directing the computing platform to initiate the one or more additional security actions.

20. One or more non-transitory computer-readable media storing instructions that, when executed by a computing platform comprising at least one processor, a communication interface, and memory, cause the computing platform to:
monitor remote communications between a first user device and an enterprise user device, wherein monitoring the remote communications comprises gathering voice information corresponding to a first user;
identify, based on the gathered voice information corresponding to the first user, a first voice sample;
configure a user profile corresponding to the first user, wherein configuring the user profile comprises linking the first voice sample to the user profile;
train, based on the first voice sample, a voice authentication model, wherein training the voice authentication model configures the voice authentication model to output similarity scores indicating a degree of similarity between voice samples and the user profile;
monitor a second user device, wherein monitoring the second user device comprises continuously gathering voice information corresponding to a second user;
identify, based on the continuously gathered voice information corresponding to the second user, a second voice sample;
execute the voice authentication model using the second voice sample as input;
generate, based on executing the voice authentication model, a first similarity score corresponding to the second voice sample, wherein generating the first similarity score comprises comparing the first voice sample to the second voice sample to identify a similarity between the first voice sample and the second voice sample;
compare the first similarity score to a threshold value;
identify, based on the comparing, whether or not the first similarity score meets or exceeds the threshold value;
in response to identifying that the first similarity score meets or exceeds the threshold value, update, based on the second voice sample, the user profile;
in response to identifying that the first similarity score does not meet or exceed the threshold value, initiate a security action, wherein initiating the security action comprises:
  suspending access, for the second user device, to a network;
  sending one or more commands to display a user interface to the enterprise user device; and
  receiving, from the enterprise user device, user input, wherein the user input directs the computing platform to:
    override the security action by reinstating access, for the second user device, to the network; and
    initiate one or more additional security actions; and
refine the voice authentication model based on the second voice sample and the first similarity score.

\* \* \* \* \*